United States Patent [19]

Chu

[11] Patent Number: 5,555,202
[45] Date of Patent: Sep. 10, 1996

[54] LOW-POWER, HIGH-PERFORMANCE BARREL SHIFTER

[75] Inventor: Tam-Anh Chu, Milpitas, Calif.

[73] Assignee: Cirrus Logic, Inc., Fremont, Calif.

[21] Appl. No.: 353,280

[22] Filed: Dec. 5, 1994

[51] Int. Cl.[6] ............................. G06F 7/00; G11C 19/00
[52] U.S. Cl. ...................... 364/715.08; 377/64; 377/70
[58] Field of Search ................... 364/715.04, 715.08, 364/736, 748; 377/60, 64, 67, 69, 70, 73, 74, 75, 77, 79, 80, 81

[56] References Cited

U.S. PATENT DOCUMENTS

| | | | |
|---|---|---|---|
| 3,961,750 | 6/1976 | Dao | 364/715.08 X |
| 4,475,173 | 10/1984 | Talmi | 364/715.08 X |
| 4,665,538 | 5/1987 | Machida | 364/715.08 X |
| 4,962,511 | 10/1990 | Tokumaru | 364/715.08 X |
| 5,130,941 | 7/1992 | Kudou | 364/715.08 |

*Primary Examiner*—Roy N. Envall, Jr.
*Assistant Examiner*—Chuong D. Ngo
*Attorney, Agent, or Firm*—Lowe, Price, LeBlanc & Becker

[57] ABSTRACT

A barrel shifter for shifting a plurality of bits in a single clock cycle has a bypass circuit through which unshifted results from an arithmetic logic unit (ALU) are bypassed around a shift circuit and provided directly to an output of the barrel shifter. An isolation circuit having tristate inverters isolates the shift circuit of the barrel shifter from the ALU results when the results are not to be shifted so that internal signal nodes of the shift circuit with high capacitance will not be switched. When the results are to be shifted, the tristate inverters of the isolation circuit are enabled to pass the results to the shift circuit where they are shifted and then provided to the barrel shifter output. By providing the results to the shift circuit only when a shift is to be performed, and otherwise isolating the shift circuit, power consumption is reduced.

37 Claims, 5 Drawing Sheets

LOW-POWER, HIGH-PERFORMANCE BARREL SHIFTER

TECHNICAL FIELD OF THE INVENTION

The present invention relates to the field of performing arithmetic operations in a processor, and more particularly to a barrel shifter, used in a processor, which shifts a plurality of bits in a fixed amount of time.

DESCRIPTION OF RELATED ART

In digital signal processing (DSP) chips used in processors, a very large number of mathematical operations, including multiplications and additions, need to be performed at high speed. To accomplish this, high speed data path components are required on the DSP chip.

A DSP chip that performs arithmetic operations is a math processor. This processor is coupled to a system bus to receive and send data over the bus to other components in the computer system. An ALU (Arithmetic Logic Unit) is one of the main components that performs arithmetic operations in the math processor within the DSP chip. In order to improve the performance of the ALU, data is often manipulated prior to its introduction into the ALU. For example, from the system bus, incoming data can be normalized by a right shifter that scales down the magnitude of the number represented by the incoming data to make the number more manageable for later operations performed by the ALU. The ALU will then perform the required operation, such as addition, logical AND/OR and EX-OR functions, on the shifted data. The result of the ALU operation is provided to a left shift device which shifts the ALU result to the left. This has the effect of scaling the number by a proper amount to restore normalization. The re-normalized result of the ALU operation is then placed on the system bus.

One type of shifter used in digital signal processing applications is a barrel shifter that will shift a plurality of bits in a single clock cycle. Barrel shifters are particularly advantageous in high performance applications in comparison to serial shifters which would require N clock cycles to shift a number by N bits. A barrel shifter forms a high-speed data path component that is very useful in high-performance applications.

A design goal of a DSP chip designer is to provide the requisite high performance while reducing its power consumption. Power consumption is problematical in barrel shifters since data passes through the barrel shifter even when the barrel shifter is not being used to shift the data, as is often the case. In addition to a loss of power, sending data which will not be shifted through the barrel shifter produces added delay.

SUMMARY OF THE INVENTION

There is a need for a low-power, high-performance barrel shifter that will shift a plurality of bits in one clock cycle when desired, but will also pass data through the barrel shifter without delay or loss of power when the data is not to be shifted.

This and other needs are met by the present invention which provides an arrangement for performing arithmetic operations in a processor. This arrangement includes an arithmetic logic unit and a barrel shifter. The arithmetic logic unit (ALU) performs arithmetic operations on data provided as input to the ALU. The ALU has an input for receiving the data and an ALU output at which M-bit results of the arithmetic operations on the data are produced. The barrel shifter includes a barrel shifter input connected to the ALU output, and a shift circuit connected to the barrel shifter input. The shift circuit selectively shifts the M-bit results and produces shifted M-bit results at a shift circuit output. A barrel shifter output is coupled to the shift circuit output. Shifted M-bit results are produced at the barrel shifter output when the shift circuit is selected to shift the M-bit results. Unshifted M-bit results are produced at the barrel shifter output when the shift circuit is selected not to shift the M-bit results. The barrel shifter input includes an isolation circuit that isolates the shift circuit from the ALU output when the shift circuit is selected not to shift the M-bit results.

The isolation circuit of the present invention reduces the consumption of power since the shift circuit is isolated when no shifting is required. The highly capacitive nodes in the shift circuit are therefore not switched when the shift circuit is not used to shift the results from the ALU.

In certain preferred embodiments of the invention, the barrel shifter input includes tristate buffers that receive as input the M-bit results from the ALU. The outputs of the tristate buffers are connected to the input of the shift circuit. When the tristate buffers are enabled, and a shift by the shift circuit is desired, the tristate buffers pass the M-bit results to be shifted into the shift circuit. When the M-bit results are not to be shifted, however, a signal causes the tristate buffers' outputs to float. This effectively isolates the shift circuit from the ALU output when the shift circuit is not to shift the M-bit results. Power consumption by the shift circuit is reduced since the internal signal nodes with high capacitance are prevented from being switched due to the floated outputs of the tristate buffers.

An especially low-power embodiment of the present invention provides an isolation circuit that includes an input multiplexer that has a plurality of tristate buffers. A first one of these tristate buffers has an input coupled to receive all M-bits of the M-bit results from the ALU output, and an output at which the M-bits of the M-bit results are produced as a function of the shift control signal, this output being coupled to the shift circuit. The input multiplexer also has a second tristate buffer having an input coupled to receive the (M-P) most significant bits of the M-bit results, and P bits set at a logical zero, where P is less than M, to form a P-left-shifted M-bit result.

By providing a multiplexer at the input, which chooses between a zero-shifted M-bit result to be input to the shift circuit, or an M-bit result that has already been shifted by P bits to be input to the shift circuit, the number of multiplexers used in the shift circuit can be reduced by one-half thus reducing the capacitance of the switch circuit by approximately half. This reduces the power consumption by approximately one-half when the shift circuit is switched.

Another feature provided by certain preferred embodiments of the present invention is the integration of the output multiplexer of the barrel shifter within the shift circuit. This integration reduces the delay from the input to the output.

The foregoing and other objects, features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figure 1:
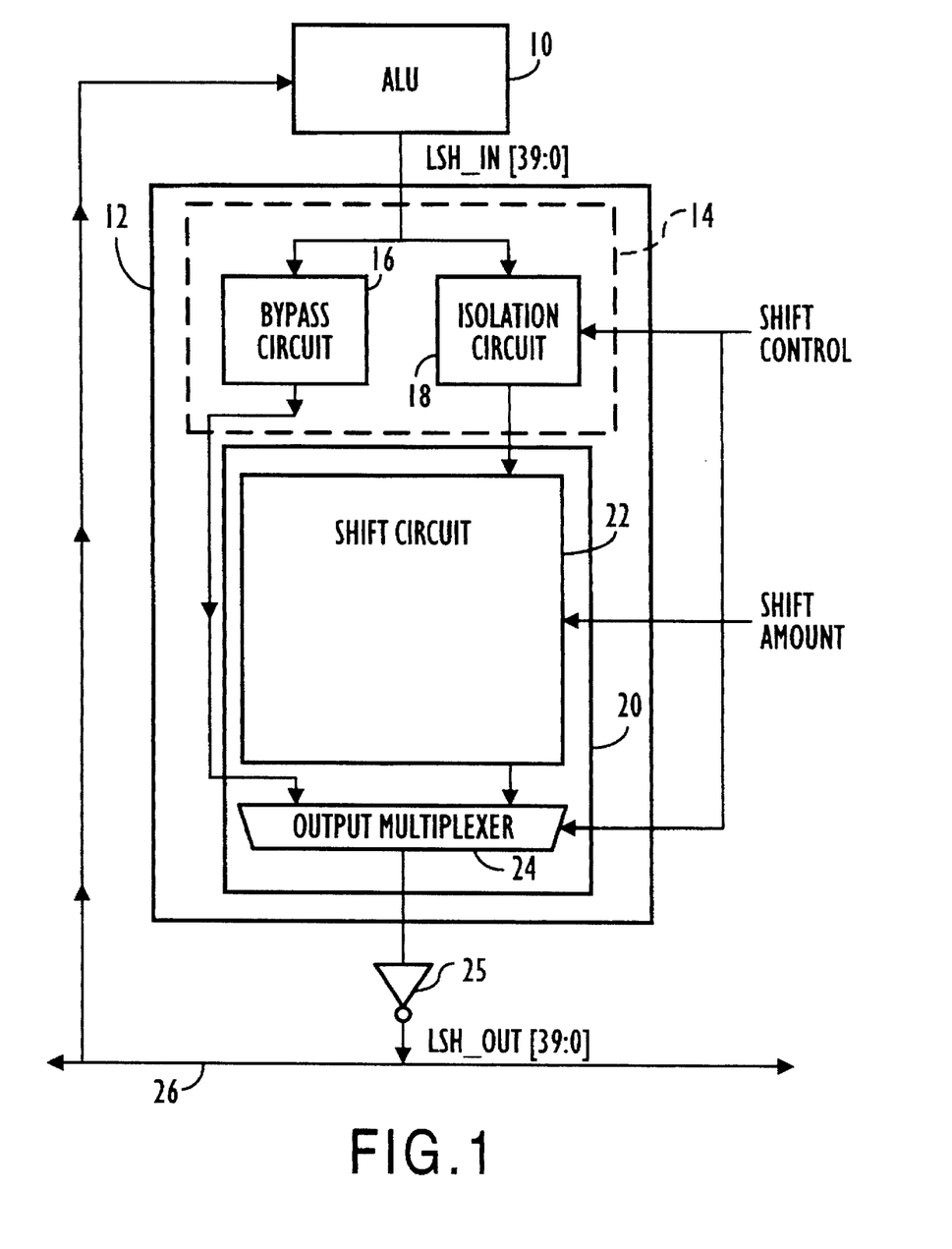
FIG. 1 is a block diagram of a barrel shifter constructed in accordance with an embodiment of the present invention and coupled to an arithmetic logic unit (ALU) and a bus.

FIG. 1 is a block diagram of a barrel shifter constructed in accordance with an embodiment of the present invention that is a high-performance barrel shifter, but operates with low power.

The barrel shifter 12 receives inputs from an arithmetic logic unit (ALU) 10 and provides output results to a bus 26. The ALU 10 receives data from the bus 26 and performs an arithmetic operation, such as addition, logical AND/OR and EX/OR on the data and produces a binary number as a result. This binary number result comprises a particular number of bits and will therefore be referred to as an M-bit result. In the exemplary embodiments described below, M is equal to 40, although other size binary numbers and results can be used without departing from the present invention.

The M-bit results from the ALU 10 are provided to a barrel shifter input 14 of the barrel shifter 12. The barrel shifter input 14 includes a bypass circuit 16 and an isolation circuit 18, each of which receives the M-bit results from the ALU 10. The isolation circuit 18 is coupled to a shift circuit 22 that performs the required shifting of the M-bit results. The output of the shift circuit 22 is provided to one input of an output multiplexer 24.

The bypass circuit 16 provides the M-bit results directly to another input of the output multiplexer 24. These M-bit results remain unshifted. The output multiplexer 24 provides (through an output buffer 25 coupled to the bus 26) either the shifted M-bit results from the shift circuit 22 or the unshifted M-bit results from the bypass circuit 16. The selection of the output signal from the output multiplexer 24 is controlled by a shift control signal that also causes the shift circuit 22 to perform a shift of the M-bit results.

During normal operation of a processor, there are many instances in which the M-bit results from the ALU should be passed to the bus 26 without being shifted. If these results were to pass through the shift circuit 22, there would be an unnecessary increase in the delay and in power consumption caused by the shift circuit 22. The use of a separate bypass circuit 16 that is directly connected to the output multiplexer 24 of the barrel shifter 12 provides a separate path for the M-bit results that will not be shifted.

Even with the use of the bypass circuit 16, it is also important to prevent the shift circuit 22 from switching internal signal nodes with high capacitance in order to save power, when the shift circuit 22 is being bypassed. Accordingly, the isolation circuit 18 passes the M-bit results to be shifted to the shift circuit 22 only when the M-bit results are to be shifted. Otherwise, the isolation circuit 18 essentially isolates the shift circuit 22 from the ALU output (i.e. the M-bit results).

In preferred embodiments of the present invention, the isolation circuit 18 is a tristate buffer whose output is connected to the inputs of the shift circuit 22. When the shift circuit 22 is to shift an M-bit result, the tristate buffer passes the M-bit result to the shift circuit 22. When the shift circuit 22 is not to shift the M-bit result, the output of the tristate buffer is floated. The inputs to the shift circuit 22 are therefore maintained at their previous state, preventing the shift circuit 22 from switching its internal signal nodes.

As will be discussed later in more detail with respect to FIG. 4, certain preferred embodiments of the present invention integrate the output multiplexer 24 within the shift circuit 22. This has the effect of reducing the delay from the input to the output.

Figure 2:
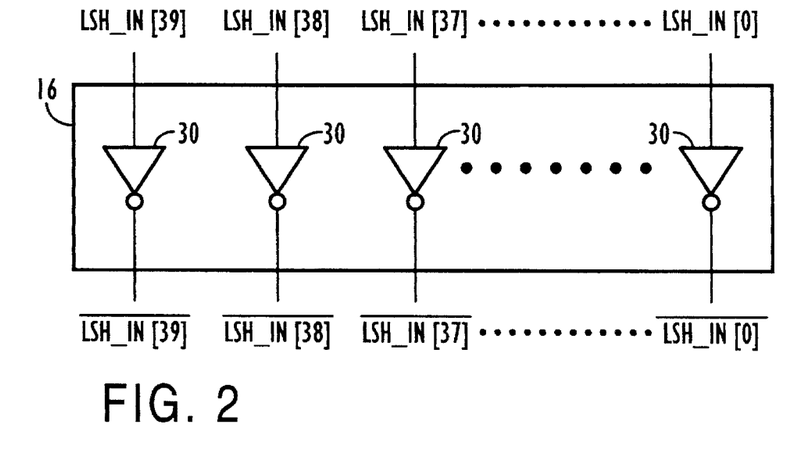
FIG. 2 is a block diagram of an exemplary embodiment of the bypass circuit used in the barrel shifter of FIG. 1.

FIG. 2 is an illustration of an exemplary embodiment of the bypass circuit 16 of FIG. 1. The bypass circuit 16 has a plurality of buffers, such as inverters 30, with a separate inverter provided for each of the M-bits of the M-bit results from the ALU 10. These M-bits (in the exemplary embodiment 40 bits) are provided by the bypass circuit 16 directly to the output multiplexer 24.

Figure 3:
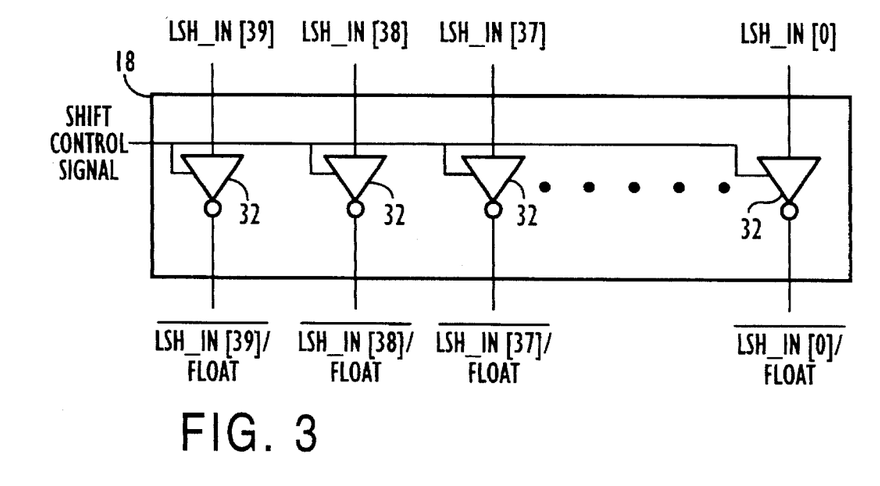
FIG. 3 is a block diagram of an exemplary embodiment of the isolation circuit used in the barrel shifter of FIG. 1.

FIG. 3 is an illustration of an exemplary embodiment of the isolation circuit 18 of FIG. 1. The isolation circuit 18 includes a plurality of buffers 32. However, unlike the buffers 30, these buffers 32 are tristate buffers and in the illustrative embodiment are tristate inverters 32. A separate tristate inverter 32 is provided for each of the M-bits of the M-bit result. The outputs of the tristate inverters 32 are coupled to the inputs of the shift circuit 22. Unlike the inverters 30 of the bypass circuit of FIG. 2, each tristate inverter 32 of the isolation circuit 18 will pass the data at its input to its output only when the tristate inverter 32 is turned on. For this purpose, each of the separate tristate inverters 32 is controlled by the shift control signal. A true value of the shift control signal indicates that the shift circuit 22 is to shift the M-bit results and causes the tristate inverters 32 to pass the M-bit results at their separate inputs to the shift circuit 22. When the shift control signal is false, indicating that the shift circuit 22 will not shift the M-bit results, the output of each of the tristate inverters 32 is floated. This effectively isolates the shift circuit 22 from the output of the ALU 10. Since the inputs of the shift circuit 22 are maintained at their previous state, the internal signal nodes of the shift circuit 22 having high capacitance will not be switched. This provides a great savings in power consumption in those instances where the M-bit results are not to be shifted.

Figure 3A:
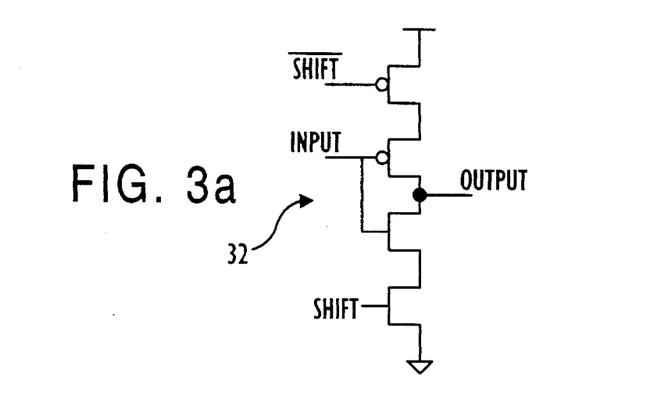
FIG. 3A is an exemplary embodiment of a tristate inverter.

A conventional tristate inverter, such as that shown in FIG. 3A, can be used as a tristate inverter 32 in the isolation circuit 18 of FIG. 3.

The shift circuit 22 uses forty multiplexers (M=40) in order to shift the 40-bit result. In the embodiment of FIG. 1, each of these forty multiplexers is a seventeen-to-one multiplexer. This allows the 40-bit result to be shifted 0–16 bits in one clock cycle.

Figure 4:
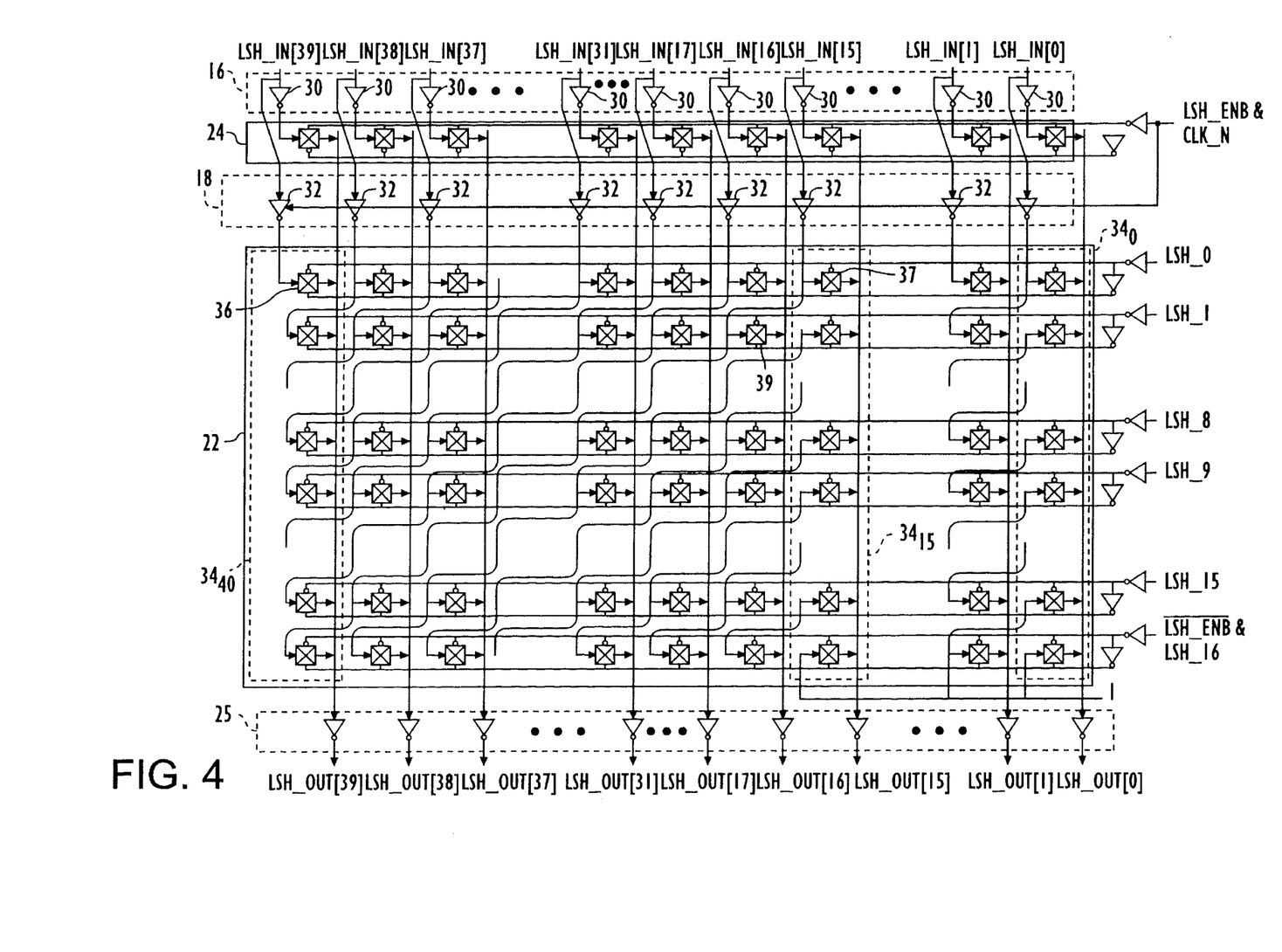
FIG. 4 is a diagram of an exemplary logic gate implementation of the barrel shifter of FIG. 1.

An exemplary implementation of the barrel shifter 12 of FIG. 1 is shown in FIG. 4. The forty inputs LSH__IN[39:0] are provided to the inverters 30 of the bypass circuit 16, and also to the tristate inverters 32 of the isolation circuit 18. Each of the multiplexers (hereinafter referred to with reference number $34_i$) comprises a plurality of transmission gates 36. The output multiplexer 24 also comprises a plurality of transmission gates 36. The input of each of the transmission gates 36 of the individual multiplexers $34_0$–$34_{39}$ are connected to the output of a different tristate inverter 32, as shown in FIG. 4. For example, the tristate inverter 32 which receives the input bit LSH__IN[15] of the M-bit result is coupled to the input of one of the transmission gates 37 of multiplexer 34$_{15}$ and will be output as LSH_OUT[15] of the shifted M-bit result when the amount of shift is LSH_0. This input bit LSH_IN[15] is also connected to the transmission gate 39 of the multiplexer 34$_{16}$ located in the LSH_1 row, so that if the M-bit results are to be shifted by one bit, the input bit LSH_IN[15] will be output as LSH_OUT[16].

As an example of shift circuit operation, if the M-bit results are to be shifted by eight bits, the shift amount signal provided as an input to the shift circuit 22 will be LSH_8. One transmission gate 36 from each of the 40 multiplexers 34$_0$–34$_{39}$ along the row of transmission gates 36 is connected to receive the inverted LSH_8 signal. These transmission gates 36 pass the bit present at their input to the output of the shift circuit 22. A logical 1 is provided as an input to the transmission gates of certain ones of the multiplexers 34$_0$–34$_{15}$ so that a 0 will be produced in response to shifts of a certain size. For example, if a shift of sixteen bits is to be performed, a 1 will be provided as an input to the transmission gates 36 of the multiplexer 34$_0$–34$_{15}$ so that a 0 will be output from the output buffer 25 for bits from LSH_OUT[0] to LSH_OUT[15].

When the shift control signal indicates that the shift circuit 22 is not to perform a shift, this causes the inverters 32 to float their outputs. The inputs to the transmission gates 36 which are connected to the tristate inverters 32 will not change so that the inputs and outputs of transmission gates are prevented from switching.

The operation of the barrel shifter 12 of FIG. 4 is essentially as follows. The M-bit results LSH_IN[39:0] from the ALU 10 are provided to the bypass circuit 16 and the isolation circuit 18. If the shift control signal LSH_ENB is false, indicating that the shift circuit 12 is not to shift the M-bit results, the transmission gates 36 of the output multiplexer 24 provide the unshifted M-bit results directly to the output buffer 25. The false shift control signal LSH_ENB is also present at the control inputs of the tristate inverters 32 of the isolation circuit 18 and causes the outputs of the tristate inverters 32 to float. This isolates the transmission gates of the multiplexers 34$_0$–34$_{39}$ and prevents the switching of these transmission gates 36. The barrel shifter 12 provides the unshifted M-bit results from the output buffer 25.

When the barrel shifter 12 is to shift the M-bit results LSH_IN[39:0] a certain number of bits 0–16, the shift control signal LSH_ENB will be true causing the transmission gates 36 of the output multiplexer 24 not to be selected. Instead, the shift amount signal, indicating the amount of bits to be shifted from 0–16, is provided to the inputs of the multiplexers 34$_0$–34$_{39}$. One transmission gate 36 from the same row of each of these forty multiplexers will be enabled to pass the input from the tristate inverter 32 to the output buffer 25. The output of the barrel shifter 12 is now the shifted M-bit result. Another embodiment of the invention, depicted in FIG. 5, reduces power even further than the embodiment of FIG. 1. It does so by using an input multiplexer 58 which allows a reduction in the number of multiplexers used in the shift circuit. As in the embodiment of FIG. 1, the embodiment of FIG. 5 has a bypass circuit 56, an isolation circuit 58, a shift circuit 50, and an output multiplexer 52. The bypass circuit 56 is identical to that of FIG. 2 and performs the same function as in the other embodiment. The isolation circuit 58 includes first and second tristate buffers 60, 62. Each of these tristate buffers 60, 62 is constructed in the same manner as that of FIG. 3 (i.e. from a plurality of tristate inverters 32, one for each bit).

Figure 5:
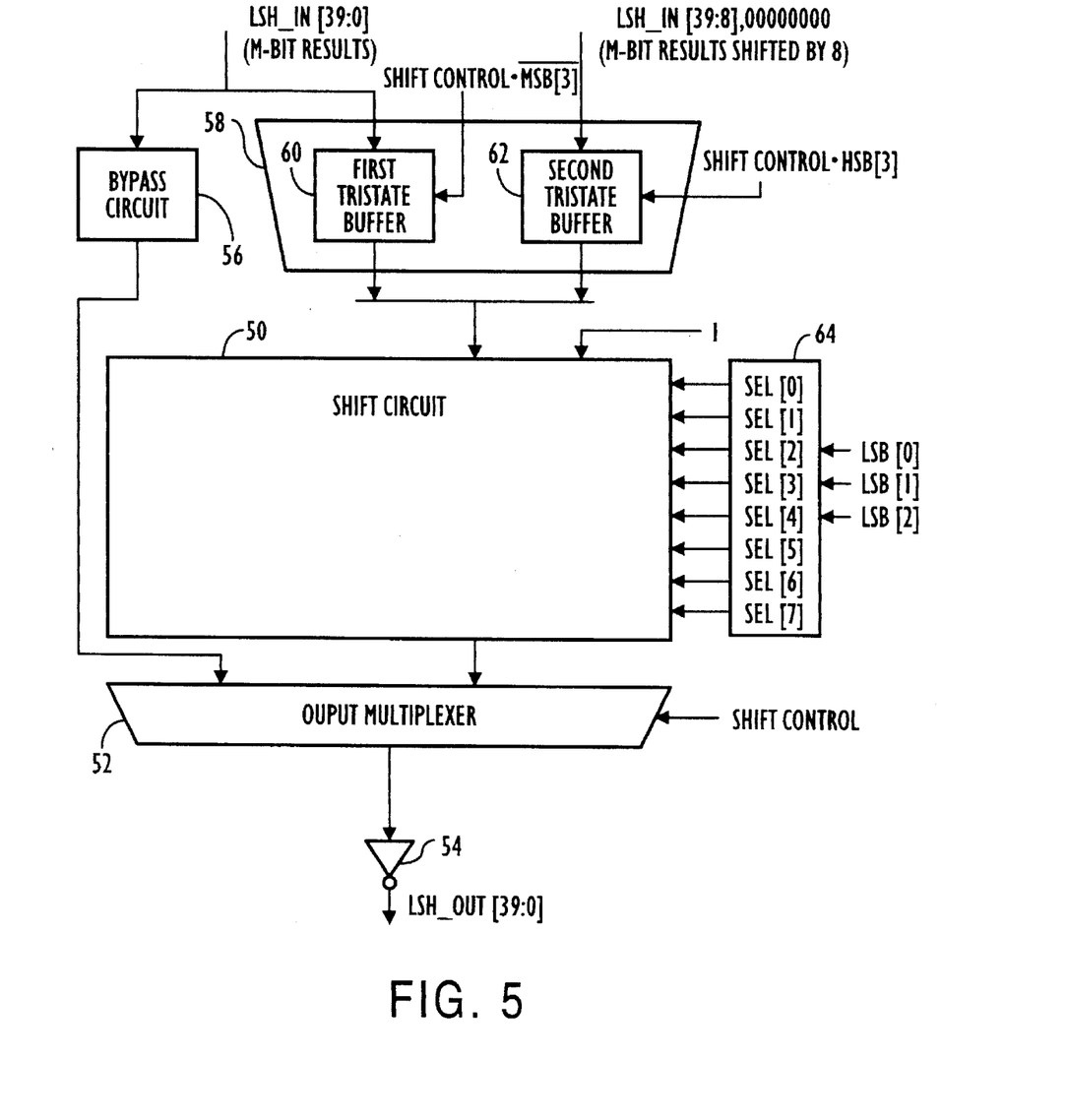
FIG. 5 is a block diagram of a barrel shifter constructed in accordance with another embodiment of the present invention.

The isolation circuit 58 essentially acts as an input multiplexer to select the output of either the first tristate buffer 60 or the second tristate buffer 62 to be provided to the shift circuit 50.

The input to the first tristate buffer 60 is the unshifted M-bit results that are also provided to the bypass circuit 56. The input to the second tristate buffer 62 are bits [39:8], 00000000. In essence, the input to the second tristate buffer 62 is the M-bit result shifted by eight bits. According to the control signals sent to the isolation circuit 58, either the unshifted M-bit results will be sent to the shift circuit 50, or the M-bit results shifted by eight bits.

One of the outputs from either the first tristate buffer 60 or the second tristate buffer 62 will be provided to the shift circuit 50 whenever the shift control signal indicates that the shift circuit 50 is to shift the M-bit results. Otherwise, as with the FIG. 1 embodiment, the outputs of the tristate buffers 60, 62 will float to prevent switching of the internal signal nodes of the shift circuit 50. The unshifted M-bit results will then be provided directly from the bypass circuit 56 through the output multiplexer 52 and through an output buffer 54.

Assume now that the shift circuit 50 is to shift the M-bit results by a certain amount so that the shift control signal is true. The isolation circuit 58 must now select between the first and second tristate buffers 60, 62. This selection is made as a function of the shift amount signal. The most significant bit of the shift amount signal is provided as a control signal to the second tristate buffer 62, and the inverted most significant bit of the shift amount signal is provided as the control signal to the first tristate buffer 60. In the exemplary embodiment, the 40-bit result from the ALU 10 can be shifted from 0–15 so that the shift amount is a four-bit signal [3:0], with the most significant bit [3].

When the most significant bit [3] is one, this indicates that the M-bit results are to be shifted by at least eight bits. Therefore, the second tristate buffer is enabled by the logical AND of the shift control signal and most significant bit [3] to pass the M-bit signal which has already been shifted by eight bits to the shift circuit 50. The first tristate buffer 60 will not be enabled at this time, and therefore floats its output.

Since the input to the shift circuit 50 has already been shifted by eight bits, the maximum amount of shifting that the shift circuit 50 will perform is eight additional bits. The shift circuit 50 can therefore be formed by eight-to-one multiplexers rather than sixteen-to-one multiplexers as in the embodiment of FIG. 1 (there are 40 such eight-to-one multiplexers in the shift circuit 50 of FIG. 5). A shift decoder 64 (a three-to-eight decoder) decodes the least significant bits [2:0] of the shift amount signal to provide select signals [0–7] to the multiplexers of the shift circuit 50. The reduction of the multiplexers from sixteen-to-one multiplexers to eight-to-one multiplexers reduces power consumption by approximately fifty percent every time the shift circuit 50 is used to shift the result.

Using the eight-to-one multiplexers of the shift circuit 50, as controlled by the three least significant bits of the shift amount signal, the M-bit results that have already been shifted by eight bits can be shifted up to seven more bits. The output provided to the output multiplexer 52 and through the output buffer 54 will be a 40-bit result that has been shifted from 0–15 bits.

When the shift circuit 50 is to shift the M-bit results by only 0–7 bits, the most significant bit [3] of the shift amount signal will be a 0, turning off the second tristate buffer 62 and causing the output of the second tristate buffer 62 to be floated.

The first tristate buffer 60 provides the M-bit results (unshifted) to the shift circuit 50. Based upon the least significant bits [3:0] of the shift amount signal, the shift circuit 50 will shift the M-bit results by 0–7 bits. The shifted M-bit results are provided to the output multiplexer 52 and to the output buffer 54. The output multiplexer 52 selects the signals from the bypass circuit 56 or the shift circuit 50 in response to the shift control signal.

The implementation of the embodiment of FIG. 5 is analogous to that of FIG. 4 so that a detailed diagram of this embodiment is not necessary.

Figure 6:
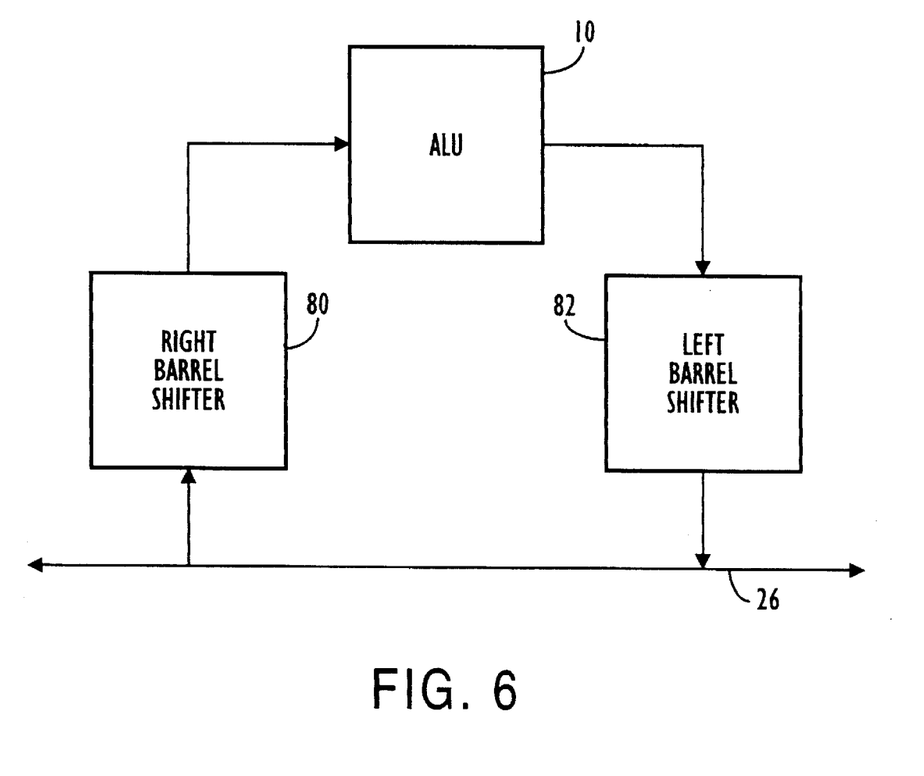
FIG. 6 is a block diagram of an arithmetic logic unit processor containing the barrel shifter of the present invention.

FIG. 6 is a block diagram of an arithmetic logic unit processor in which the shifter of either FIG. 1 or FIG. 5 is used. When data arrives on the system bus 26 to be processed by the ALU 10, the data first passes through a right shifter 80. A right shift by the right shifter 80 divides the number by $2^N$, where N is the number of bit positions shifted. This reduces the number to make it more manageable for later operations. After the right shifting, further operations such as rotation/inversion can be performed. The elements to perform these functions, as well as additional support elements including a flag register, accumulator, saturation logic, etc., are not depicted in FIG. 6 so as not to obscure the invention. The right shifted data is provided to the ALU 10 that then preforms addition, logical AND/OR and EX-OR operations on the data. The output of the ALU 10 is provided to the barrel shifter 82 that is a left barrel shifter constructed in accordance with either the embodiment of FIG. 1 or FIG. 5. The barrel shifter 82 scales the number by shifting the bits to the left to restore normalization. After the barrel shifter 82, the data is passed to the bus 26.

Although the present invention has been described and illustrated in detail, it is clearly understood that the same is by way of illustration and example only and is not to be taken by way of limitation, the spirit and scope of the present being limited only by the terms of the appended claims.

What is claimed is:

1. An arrangement for performing arithmetic operations in a processor, comprising:
   an arithmetic logic unit (ALU) that performs arithmetic operations on data provided as input to the ALU, the ALU having an input for receiving the data and an ALU output at which M-bit results of the arithmetic operations on the data are produced; and
   a barrel shifter including:
   a barrel shifter input coupled to the ALU output;
   a shift circuit coupled to the barrel shifter input, the shift circuit selectively shifting the M-bit results and producing shifted M-bit results at a shift circuit output; and
   a barrel shifter output coupled to the shift circuit output, with the shifted M-bit results produced at the barrel shifter output when the shift circuit is selected to shift the M-bit results, and unshifted M-bit results produced at the barrel shifter output when the shift circuit is selected not to shift the M-bit results,
   wherein the barrel shifter input includes an isolation circuit that isolates the shift circuit from the ALU output when the shift circuit is selected not to shift the M-bit results.

2. The arrangement of claim 1, wherein the barrel shifter output includes an output multiplexer coupled to the barrel shifter input and to the shift circuit output and that selectively produces as an output the shifted M-bit results and the unshifted M-bit results in response to a shift control signal.

3. The arrangement of claim 2, wherein the isolation circuit includes a shift control signal input, the isolation circuit isolating the M-bit results from the shift circuit in response to the shift control signal to thereby prevent the shift circuit from shifting the M-bit results.

4. The arrangement of claim 3, wherein the barrel shifter input further includes a first buffer that has a first buffer input coupled to the ALU output and a first buffer output directly coupled to the output multiplexer to provide the output multiplexer with the unshifted M-bit results.

5. The arrangement of claim 4, wherein the isolation circuit includes at least one tristate buffer having a tristate buffer input coupled to the ALU output and a tristate buffer output coupled to the shift circuit, the tristate buffer being responsive to the shift control signal to isolate the shift circuit from the ALU output when the shift circuit is selected not to shift the M-bit results, and to produce the M-bit results to the shift circuit at the tristate buffer output when the shift circuit is selected to shift the M-bit results.

6. The arrangement of claim 5, wherein the shift circuit includes M shift multiplexers, and each of said M shift multiplexers is an N-to-1 multiplexer, where N is a number of bits of the M-bit results to be shifted.

7. The arrangement of claim 6, wherein the tristate buffer includes M tristate inverters, with each tristate inverter receiving as an input a different bit of said M-bit results.

8. The arrangement of claim 7, wherein each M shift multiplexer includes N transmission gates and is connected to receive the output of a different one of said M tristate inverters.

9. The arrangement of claim 8, wherein the output multiplexer includes M transmission gates enabled by the shift control signal, and the first buffer input includes M inverters, with each inverter receiving as an input a different bit of said M-bit results and providing said bit as an output to a different one of said transmission gates of the output multiplexer.

10. The arrangement of claim 4, wherein the isolation circuit includes an input multiplexer that has a plurality of tristate buffers, with a first one of said tristate buffers having an input coupled to receive all M bits of the M-bit results from the ALU output and an output at which the M bits of the M-bit results are produced as a function of the shift control signal, said output coupled to the shift circuit; a second one of said tristate buffers having an input coupled to receive (M-P) most significant bits of the M-bit results, and P bits at a logical zero, where P is less than M, to form a P-left-shifted M-bit result.

11. The arrangement of claim 10, wherein P=M/2, and P and M are powers of 2.

12. The arrangement of claim 11, wherein the shift circuit includes M shift multiplexers, and each of said M shift multiplexers is an (N/2)-to-1 multiplexer, where N is a number of bits of the M-bit result or the P-left-shifted M-bit result to be shifted.

13. The arrangement of claim 12, wherein the first tristate buffer includes M tristate inverters, with each tristate inverter of the first tristate buffer receiving as an input a different bit of said M-bit results, and wherein the second tristate buffer includes M tristate inverters, with each tristate inverter of the second tristate buffer receiving as an input a different bit of said P-left-shifted M-bit result.

14. The arrangement of claim 13, wherein the shift control signal includes a most significant bit of a shift amount signal that indicates the number of bits N the M-bit result or the P-left-shifted M-bit result is to be shifted, the first tristate buffer responsive to an inverted most significant bit and the second tristate buffer responsive to the most significant bit to select which of the first and second tristate buffers will provide their inputs to the shift circuit and which will isolate their inputs from the shift circuit.

15. The arrangement of claim 14, wherein the barrel shifter further includes a shift amount decoder having an input that receives the least significant bits of the shift amount signal, and an output coupled to the shift circuit, the shift amount decoder decoding the shift amount signal to a select signal to select the signals to be output by the M shift multiplexers.

16. The arrangement of claim 15, wherein each M shift multiplexer includes N/2 transmission gates and is connected to receive the output of a different one of said M tristate inverters from each of the first and second tristate buffers.

17. The arrangement of claim 16, wherein the output multiplexer includes M transmission gates enabled by the shift control signal, and the first buffer input includes M inverters, with each inverter receiving as an input a different bit of said M-bit results and providing said bit as an output to a different one of said transmission gates of the output multiplexer.

18. The arrangement of claim 2, wherein the output multiplexer is integral with the shift circuit.

19. A barrel shifter for shifting bits of a binary number a selected amount, comprising:

a shift circuit that shifts bits of a first binary number by the selected amount, the shift circuit having an input, and an output at which a shifted first binary number is produced;

an input circuit having a bypass circuit and an isolation circuit, the bypass circuit including an input that receives the first binary number and an output at which the first binary number is produced, the isolation circuit including an input that receives the first binary number and an output at which the first binary number is produced, the isolation circuit output coupled to the shift circuit input, the isolation circuit either producing the first binary number at the isolation circuit output or isolating the shift circuit in response to a shift signal; and an output selection device having a first input coupled to the bypass circuit output, a second input coupled to the shift circuit output, and an output at which either the first binary number or the shifted first binary number is produced in response to a selection signal.

20. The barrel shifter of claim 19, wherein the isolation circuit includes an input multiplexer with first and second inputs, the first input receiving the first binary number and the second input receiving a second binary number which is the first binary number shifted by a predetermined amount, and an output at which the first and second binary numbers are selectively produced in response to a control signal.

21. The barrel shifter of claim 20, wherein the binary number is M bits and each of the first and second inputs is a tristate buffer, with the tristate buffer of the first input having an input coupled to receive all M bits of the first binary number, and the tristate buffer of the second input having an input coupled to receive the second binary number, where the second binary number is the (M-P) most significant bits of the first binary number, and P bits that are at a logical zero, where P is less than M, the first and second tristate buffers each having an output coupled to the shift circuit input.

22. The barrel shifter of claim 21, wherein the first tristate buffer includes M tristate inverters, with each tristate inverter of the first tristate buffer receiving as an input a different bit of said first binary number, and wherein the second tristate buffer includes M tristate inverters, with each tristate inverter of the second tristate buffer receiving as an input a different bit of said second binary number.

23. The barrel shifter of claim 22, wherein the control signal includes a most significant bit of a shift amount signal that indicates the number of bits N the first binary number or the second binary number is to be shifted, the first tristate buffer responsive to an inverted most significant bit and the second tristate buffer responsive to the most significant bit to select which of the first and second tristate buffers will provide their inputs to the shift circuit and which will isolate their inputs from the shift circuit.

24. The barrel shifter of claim 23, wherein the shift circuit includes M shift multiplexers, and each of said M shift multiplexers is an (N/2)-to-1 multiplexer.

25. The barrel shifter of claim 24, wherein the barrel shifter further includes a shift amount decoder having an input that receives the least significant bits of the shift amount signal, and an output coupled to the shift circuit, the shift amount decoder decoding the shift amount signal to a select signal to select the signals to be output by the M shift multiplexers.

26. The barrel shifter of claim 25, wherein each M shift multiplexer includes N/2 transmission gates and is connected to receive the output of a different one of said M tristate inverters from each of the first and second tristate buffers.

27. The barrel shifter of claim 26, wherein the output selection device is an output multiplexer that includes M transmission gates enabled by the shift control signal, and the bypass circuit includes M inverters, with each inverter receiving as an input a different bit of said first binary number and providing said bit as an output to a different one of said transmission gates of the output multiplexer.

28. The barrel shifter of claim 19, wherein the output selection device includes an output multiplexer having inputs coupled to the shift circuit output and to the bypass circuit output.

29. The barrel shifter of claim 28, wherein the isolation circuit includes a shift signal input, the isolation circuit isolating the first binary number from the shift circuit in response to the shift signal to thereby prevent the shift circuit from shifting the first binary number.

30. The barrel shifter of claim 29, wherein the bypass circuit includes a first buffer that has a first buffer input that receives the first binary number and a first buffer output directly coupled to the output multiplexer to provide the output multiplexer with the first binary number.

31. The barrel shifter of claim 30, wherein the isolation circuit includes at least one tristate buffer having a tristate buffer input that receives the first binary number and a tristate buffer output coupled to the shift circuit input, the tristate buffer being responsive to the shift signal to isolate the shift circuit when the shift circuit is selected not to shift the first binary number, and to produce the first binary number to the shift circuit at the tristate buffer output when the shift circuit is selected to shift the first binary number.

32. The barrel shifter of claim 31, wherein the shift circuit includes M shift multiplexers, and each of said M shift multiplexers is an N-to-1 multiplexer, where N is a number of bits of the first binary number to be shifted.

33. The barrel shifter of claim 32, wherein the tristate buffer includes M tristate inverters, with each tristate inverter receiving as an input a different bit of said first binary number.

34. The barrel shifter of claim 33, wherein each M shift multiplexer includes N transmission gates and is connected to receive the output of a different one of said M tristate inverters.

35. The barrel shifter of claim 34, wherein the output multiplexer includes M transmission gates enabled by the shift signal, and the first buffer input includes M inverters, with each inverter receiving as an input a different bit of said first binary number and providing said bit as an output to a different one of said transmission gates of the output multiplexer.

36. A method of selectively shifting data in a barrel shifter having a shift circuit, comprising:

receiving data at the barrel shifter;

receiving a signal indicating whether the barrel shifter is to shift data, and in response, (a) producing the data as unshifted data by bypassing the data around a shift circuit of the barrel shifter and isolating the shift circuit from the data when the barrel shifter is not to shift the data; and (b) producing the data as shifted data by passing the data through the shift circuit when the barrel shifter is to shift the data.

37. The method of claim 36, wherein the step of isolating includes tristating the data at inputs to the shift circuit.

* * * * *